Jan. 23, 1968    A. L. NASVYTIS    3,364,761
TORQUE SENSITIVE MULTI-ROLLER FRICTION DRIVE
Filed Dec. 15, 1965    2 Sheets-Sheet 1
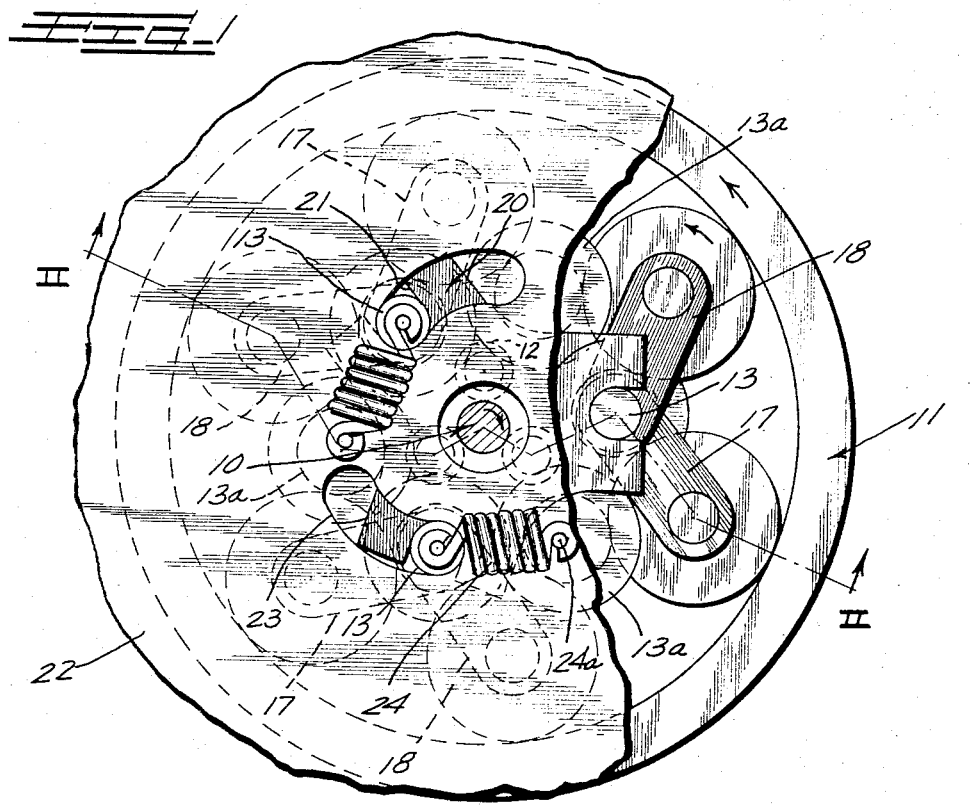
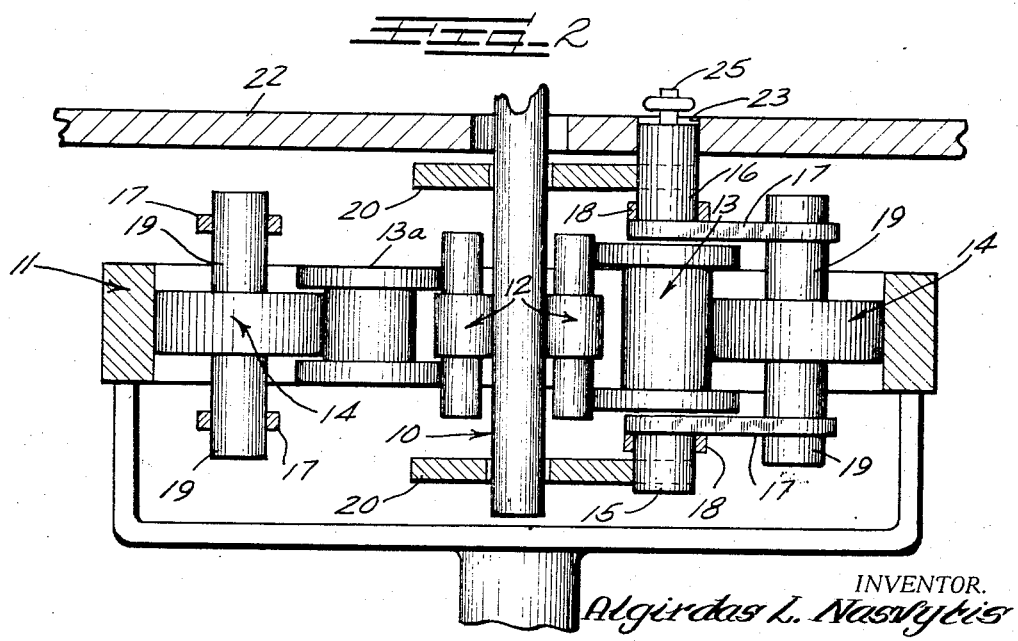
INVENTOR.
Algirdas L. Nasvytis
BY ATTORNEYS Jan. 23, 1968  A. L. NASVYTIS  3,364,761
TORQUE SENSITIVE MULTI-ROLLER FRICTION DRIVE
Filed Dec. 15, 1965  2 Sheets-Sheet 2

INVENTOR.
Algirdas L. Nasvytis

BY Hill, Sherman, Meroni, Gross & Simpson ATTORNEYS

United States Patent Office 3,364,761
Patented Jan. 23, 1968

3,364,761
TORQUE SENSITIVE MULTI-ROLLER
FRICTION DRIVE
Algirdas L. Nasvytis, Cleveland, Ohio, assignor to TRW, Inc., Cleveland, Ohio, a corporation of Ohio
Filed Dec. 15, 1965, Ser. No. 514,063
9 Claims. (Cl. 74—208)

The present invention relates to mechanical drive transmission systems and is, more particularly, concerned with the provision of a novel and substantially improved gearing system in which the system preload may automatically be modified to increase as the torque on the system increases or, alternatively, decrease as the torque on the system becomes smaller. Manual means may also be provided for purposes of controlling the operation of the drive system.

As those skilled in the art of planetary gearing are aware, friction gearing of the planetary type offers many advantages. Friction gearing is essentially noiseless since there is no tooth-to-tooth spur gear contact. Further, friction type transmissions may often be substantially lower in cost as a result of elimination of such relatively expensive items as spur gears, in favor of simply manufactured circular elements. However, the transmission of heavy torques by friction gearing is difficult unless the preload provided between contacting gear members is high. Unfortunately, it has been found that in situations where the preloading has been substantially increased to accommodate high torque power transmission, the efficiency of the over-all drive system is markedly reduced for low torque transmission situations. When low torque conditions exist, it is desired, and imperative in the accomplishment of a high efficiency drive, that the preload between the driving elements be substantially reduced. To my knowledge, the manipulation of the preload bearing contact between the driving members of a friction type planetary gearing system has not been accomplished and, accordingly, a truly universally acceptable friction drive planetary transmission has not been available.

In accordance with the principles of the present invention, I provide a compound planetary gear type system employing three rows of roller planet members interposed between a sun member and a ring member. As those skilled in the friction gear transmission construction are aware, friction drive systems employing a plurality of rows of planets are inherently not stable unless the planets at least in one row are fixed relative to each other. In the past, this lack of stability of planetary gearing employing multiple rows of planet members has been a disadvantage considered highly undesirable. In the present instance, however, this disadvantage has been utilized as the basis for providing a wide range of preload conditions, thereby permitting highly efficient torque transmission over heavy load, as well as light load conditions.

This is accomplished in the case of the present invention by providing a first row of friction gear cylinders comprising three or more ($n$) members in spaced rolling contact with the drive shaft member. A second row of friction gears comprising six or more ($2n$) members is placed in rolling contact with the first row of gears and a third row of friction gears, six in number (or $2n$), is positioned in rolling contact with the second row and is also in rolling contact with a ring member having a radially inwardly facing surface in friction contact with the third row of gears.

Due to the inherent instability of such a system, a spider or rotating member is provided having three (or $n$) radial slots for co-operation with three or $n$ pairs of third row members. This spider requires the pairs of friction gears of the third row to move peripherally in unison. In such circumstances, the relative positions of the various second row gears with respect to each other and a third row of gears will determine the amount of preload in the system.

Accordingly, a cam-slotted retainer plate is provided. The slots in the plate have an arcuate configuration. Spring means is provided for urging linked third row planet members toward each other. Each pair of third row roller members engaged with each of the second row members is rigidly linked to a pivot element carried in the arcuate cam slot and in a radial slot. This link connection permits rotation of the third row rollers about their own axes and controls movement toward and away from each other. In initial assembly, the roller members are positioned with the third row rollers in their asymmetrical position and with resultant very light or minor preload conditions. With an increase in torque demand in the output ring member, the bearing reaction in the ring gear correspondingly increases tending to rotate the third row rollers in a direction causing the link pivots to move radially outwardly in the cam slots in a direction tending to move all six third row rollers into equally spaced relation. The preload is a maximum when the rollers are equally spaced or perfectly symmetrical (meaning, as used in this application, about a line drawn through the axis of the sun and the axes of a pair of diametrically opposite third row rollers).

From the observations made above, it will be clear that by providing apparatus for moving the three row planetary system from an asymmetrical toward an increasingly symmetrical condition, a minimum preload may be provided for low torque drive conditions with an automatic increase to maximum preload as the system transmits increasingly greater torque. In the present invention a simple construction satisfactorily accomplishing this function is achieved.

It is, accordingly, an object of the present invention to provide an improved friction drive system.

Still another object of the present invention is to provide a friction drive system incorporating automatically variable preload.

Another object of the invention is to provide a torque responsive gear system which operates to provide a maximum, high level, preload between contacting gears, at such times as a maximum torque transfer is demanded.

A feature of the invention resides in peripherally tying a plurality of third stage rollers together while at the same time permitting their relative circumferential movement.

Another feature of the invention resides in the provision of spring means for normally biasing the third stage rollers of a three radial stage gear system into a direction of movement providing a minimum preload condition.

Yet another feature of the present invention is the utilization of inherent instability of certain forms of multi-roller friction drive systems for purposes of preload control.

Still other and further objects and features of the invention will at once become apparent from a consideration of the attached drawings and specification wherein one embodiment of my invention is shown by way of illustration only, and wherein:

FIGURE 1 is an end-elevational view, partially broken away to show details of internal construction, of a friction gear system in accordance with the present invention;

FIGURE 2 is a cross-sectional view taken along the line II—II of FIGURE 1;

As shown on the drawings:

Figure 3:
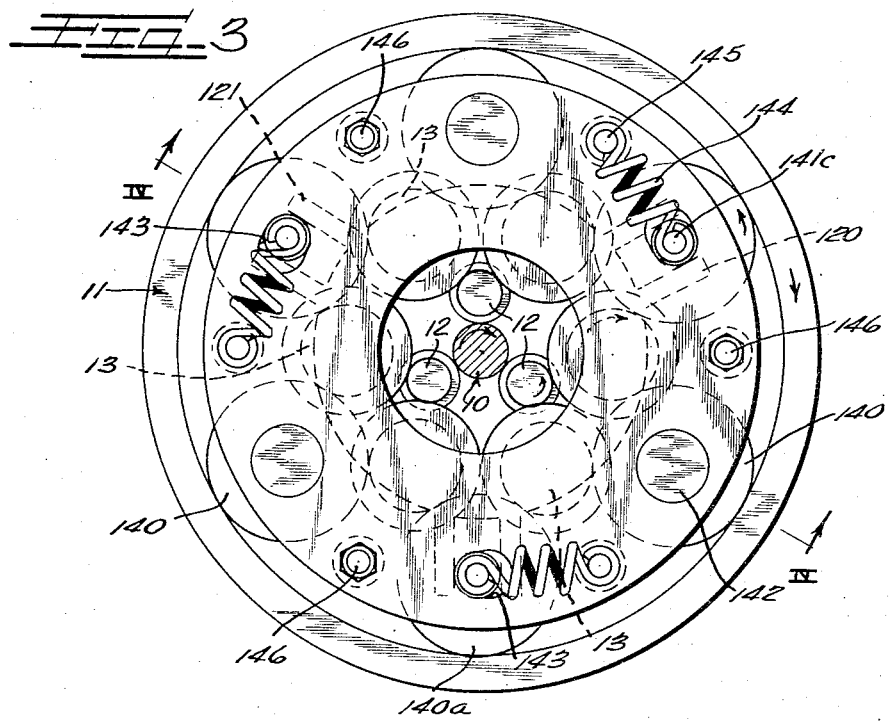
FIGURE 3 is an end-elevational view showing a modified form of the invention.

As may be seen from a consideration of FIGURES 1 and 2 of the drawings, the invention takes the form of a friction gear system employing a central drive or sun member 10 drivingly connected to a rotatable output ring member 11 by way of three rows of friction gears 12, 13 and 14. As may be seen, the first row of friction gears or rollers 12 comprises three rollers only while the third row comprises six rollers 14. The second row, for convenience in reference, has three of its rollers identified as 13 and the remaining three rollers identified as 13a.

In the embodiment illustrated, the shafts 15 and 16 pivotally carry rigid connecting links 17, 18, which links are, in turn, pivotally connected to extensions 19 on rollers 14. To provide stiffness, pivots 15, 16 may preferably be integral with links 17 and freely pivotal relative to links 18. The pivots 15, 16 are constrained relative to each other in a peripheral sense by means of spiders 20, each having three radially extending notches 21 which coact with the pivots 15, 16. The spiders 20 are mounted for relative rotation relative to the shaft 10 and are constrained against more than limited rotational movement relative to fixed mounting plate 22 by means of cam slots 23 and springs 24. The springs 24 are connected in any convenient manner to the plate 22, as at 24a, and to the pivots 15, 16 by way of a pivotal connection 25 or, alternatively, the springs may be connected to the spiders themselves rather than the pivots 15, 16. This is true since the function of springs 24 is to bias the spiders 20 in a counterclockwise direction, as viewed in FIGURE 1, the function of which is, in turn, to urge the pivots 15, 16 to the counterclockwise end of the arcuate cam slot at which position the rollers 14 are at their most asymmetrical minimum preload position. The pivots 15, 16 move slightly radially outwardly spreading their linked rollers 14 further apart permitting rollers 13 to move outwardly. The rollers 13a will move slightly radially inwardly as contacting rollers 14 move closer together until a condition is reached in which rollers 13 and 13a are both at the same radius from the center of rotation of shaft 10. At this point all of the rollers 12, 13 and 14 will be symmetrically positioned and preload conditions between the various contacting roller surfaces will be at a maximum.

The tendency of the parts to move toward the symmetrical condition upon an increase in load is automatic. As the input shaft 10 rotates in the clockwise direction, the output ring 11 will rotate in the counterclockwise direction. If the load on the output member 11 increases, an increased bearing reaction will increase the effect being that of an effort on the part of the three rollers 12 to back up to place the axis of the rollers 12 and 14 on the same radius line passing through the center of rotation of shaft 10. As the reaction forces increase, the springs 24 are stretched. It has been found that relatively less than 10% of the preload force is employed for control purposes, and that such force will completely satisfactorily control the preload from a very low, nominal value to a maximum sufficient to transfer very high loads. It has been found that the total motion of the rollers 13 necessary to move from an asymmetrical position of minimum, substantially nil, preload, to the symmetrical position of maximum preload approximates only .025 inch in the radial direction. In view of the small movements of the rollers 13, the springs 24 may be relatively stiff.

In the embodiment of the invention illustrated in FIGURES 1 and 2, it will be observed that rollers 13 and 13a are of differing axial lengths. This is the case in the illustrated form since the larger diameter positions of rollers 13 and 13a, although identical in diameter, must overlap each other in order to permit assembly in the compact form illustrated. This overlapping is clearly shown in FIGURE 1. By providing the overlap above mentioned, and by simultaneously employing compound rollers in which the drive input diameter is in each case larger than the output diameter, a maximum gear reduction is achieved in a minimum space.

In the embodiment illustrated in FIGURES 1 and 2, movement of the spider 20 against the action of spring 24 is automatically controlled. It should be understood, however, that while automatic control of the preload is desired, and has been effected in accordance with the present invention, nevertheless, the spider 20 may readily be rotated in a clockwise direction under manual means, by directly connecting a hand lever to the spider 20 or, alternatively, by applying manually controlled power actuation. This latter may be readily achieved by attaching the output rod of a hydraulic cylinder of pneumatic actuator to the spider 20 carrying its housing to the fixed plate 22. Such manual control permits modification of the preload at will and it is understood that in such circumstances the springs 24 may be dispensed with.

Slots 23 need only be of sufficient length to permit achievement of a symmetrical arrangement of the rollers. The clockwise end of the slots 23 would act as stops preventing the pivots 15, 16 from going beyond the symmetrical condition by overpowering springs 24. Alternatively, an adjustable stop may be attached to the plate 22 adjacent each slot 23 for intercepting the pivots 15, 16 at the maximum, symmetrical position.

Figure 4:
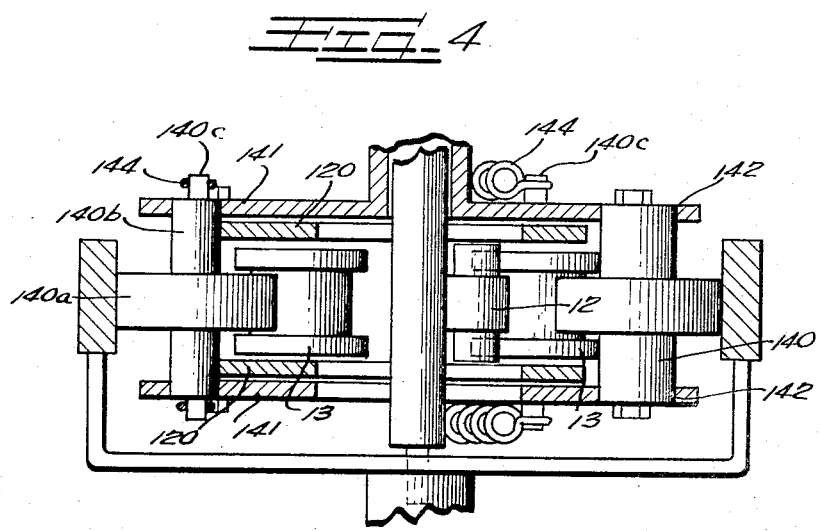
FIGURE 4 is a cross-sectional view taken along line IV—IV of FIGURE 3.

In the embodiment of the invention illustrated in FIGURES 3 and 4, a similar number of rows of rollers are employed. There, the sun roller is generally indicated at 10, the first row of rollers is designated 12, the second row of rollers is designated 13, and the third row of rollers is designated 140 and 140a. In this latter instance, it will be observed that the third or outermost row of rollers comprises three rollers that are positively located, and the remaining three rollers, designated 140a comprising rollers of identical diameters with rollers 140 but having spring-biasing means connected therewith for modifying their relative positions around the periphery of the system. The rollers 140 and 140a are in driving relation with the ring 11.

A carrier element 141 provides fixed relative positioning for the rows 140 by means of bushings 142 and is provided with peripheral slots 143 permitting the stub extensions 140b of the rollers 140a to move peripherally. Springs 144 resiliently act against post extensions 140c on the rollers 140a and posts 145 fixedly secured to the carrier 141. Spider elements 120 having radial slots 121 provide equal spacing for the three rollers 140a and require them to move in unison relative to the carrier 141 and the rollers 140. To provide proper alignment, the carrier plates are rigidly secured to each other by means of pass-through bolts 146. The two plates representing spider 120 may similarly be secured to each other.

In operation of the device illustrated in the embodiments illustrated in FIGURES 3 and 4, an increase in torque drive will cause the components to wind up, when the drive is in the direction of the arrows indicated, such that with increased torque rollers 140a will tend to move against the springs 144 in the clockwise direction relative to the carrier 141. This movement will cause the rollers 140a to move closer to a completely equal peripheral spacing. With a lessening of the torque transmitted, the rollers 140a will ease backwardly into the increasingly less loaded condition in which the third row rollers are alternately close and more widely spaced and in which the preload is at a minimum condition. Accordingly, with increasing load for the preload factor in the system increases, thereby providing for increased friction drive pressures and more efficient friction driving. At the same time, however, when low torques are being transmitted, high preload conditions are eliminated, thereby minimizing the losses under the relatively lightly loaded conditions.

It will be apparent to those skilled in the art that still further variations and modifications may be made in the structure of the present invention without departing from the scope of the novel concepts thereof. It is, accordingly, my intention that the scope of the invention be limited solely by that of the hereinafter appended claims.

I claim as my invention:

1. In combination in a friction drive system, a rotatable sun member, an annular ring member, a plurality of rows of intermediate friction roller members comprising a first row in contact with said sun with each roller in said row being in contact with a pair of rollers in a second row, each of the rollers of said second row being in contact with a pair of rollers in a third row which last-named rollers are in turn in drive connection with said ring member, connecting means positively peripherally spacing one-half of the rollers of said third row relative to the other half, and means normally biasing adjacent pairs of said last-named rollers peripherally toward each other and means operable to move said last-named rollers toward an equally spaced condition.

2. In combination in a friction drive system, a rotatable sun member, an annular ring member, a plurality of rows of intermediate friction roller members comprising a first row in contact with said sun with each roller in said row being in contact with a pair of rollers in a second row, each of the rollers of said second row being in contact with a pair of rollers in a third row which last-named rollers are in turn in drive connection with said ring member, connecting means peripherally spacing the rollers of said third row relative to each other, and means adjusting the position of said last-named rollers relative to each other to move said rollers into or out of a peripherally equally spaced condition.

3. In combination in a friction drive system, a rotatable sun member, an annular ring member, a plurality of rows of intermediate roller members comprising a first row in contact with said sun with each roller in said row being in contact with a pair of rollers in a second row, each of the rollers in said second row being in contact with a pair of rollers in a third row which last-named rollers are in turn in drive connection with said ring member, means positively peripherally spacing one-half of the rollers of said third row relative to each other, and means normally biasing the remaining half of the rollers of said third row peripherally toward said one-half as a group.

4. In combination in a friction drive system, a rotatable sun member, an annular ring member, a plurality of rows of intermediate roller members comprising a first row in contact with said sun with each roller in said row being in contact with a pair of rollers in a second row, each of the rollers in said second row being in contact with a pair of rollers in a third row which last-named rollers are in turn in drive connection with said ring member, means positively peripherally spacing one-half of the rollers of said third row relative to each other, and means normally biasing the remaining half of the rollers of said third row peripherally toward said one-half as a group, said last-named means being automatically actuated upon increase in torque transmission to provide movement toward equal spacing with such increase in torque.

5. In combination in a friction drive system, a rotatable sun member, an annular ring member driven thereby, a plurality of rows of intermediate friction gear rollers between said sun member and annular ring comprising a first row in contact with said sun having each roller thereof in contact with a pair of rollers in a second row and each of said rollers of said second row being in contact with a pair of rollers in a third row in turn in contact with said ring member, connecting means positively peripherally spacing the rollers of said third row relative to each other and means normally biasing pairs of said third row rollers toward each other while maintaining contact between all of the rows of said rollers.

6. In combination in a friction drive system, a rotatable sun member, an annular ring member driven thereby, a plurality of rows of intermediate friction gear rollers between said sun member and annular ring comprising a first row in contact with said sun having each roller thereof in contact with a pair of rollers in a second row and each of said rollers of said second row being in contact with a pair of rollers in a third row in turn in contact with said ring member, connecting means positively peripherally spacing the rollers of said third row relative to each other and means normally biasing said third row rollers toward asymmetrical positions while maintaining contact between all of the rows of said rollers, said last-named means being automatically actuated upon increase in torque transmission to provide movement of said second row of rollers toward equal radial positions to provide maximum system preload.

7. In combination in a friction drive system, a rotatable sun member, an annular ring member driven thereby, a plurality of rows of intermediate friction gear rollers between said sun member and annular ring comprising a first row in contact with said sun having each roller thereof in contact with a pair of rollers in a second row and each of said rollers of said second row being in contact with a pair of rollers in a third row in turn in contact with said ring member, connecting means positively peripherally spacing one-half of the rollers of said third row relative to the other half and means normally biasing said connecting means to move said third row rollers toward an asymmetrical condition while maintaining contact between all of the rows of said rollers, said last-named means being operable automatically to provide movement of said connecting means to move said third row rollers toward a symmetrical condition to provide maximum preload in which all rollers of the second row have the same radial distance from the axis of rotation of said sun member.

8. In combination in a friction drive system, a rotatable sun member, an annular ring member, a plurality of rows of intermediate friction roller members comprising a first row in contact with said sun and each roller in said row being in contact with a pair of rollers in a second row, and each of the rollers of said second row being in contact with a pair of rollers in a third row which last-named rollers are in turn in drive connection with said ring member, connecting means positively peripherally spacing the rollers of said third row relative to each other, and means normally biasing said connecting means to position the rollers of the third row into alternate close and wide spacing and operable to move said last-named rollers toward positions in which all rollers in the third row are equally peripherally spaced, said connecting means comprising a rigid spider having radial slots therein accommodating pivot means rigidly linked to adjacent third row rollers and means moving said pivot means radially in said slots upon increase in torque to thereby move the third row rollers toward an equally spaced maximum preload condition.

9. In combination in a friction drive system, a rotatable sun member, an annular ring member, a plurality of rows of intermediate friction roller members comprising a first row in contact with said sun and each roller in said row being in contact with a pair of rollers in a second row, and each of the rollers of the second row being in contact with a pair of rollers in a third row which last-named rollers are, in turn, in drive connection with said ring member, connecting means positively peripherally spacing the rollers of said third row relative to each other, and means normally biasing said connecting means to position the rollers of the third row into alternate close and wide spacing and operable to move said last-named rollers toward positions in which all rollers in the third row are equally peripherally spaced, said connecting means comprising a rigid spider having radial slots therein accommodating the pivot axes of one-half of the rollers of said third row whereby movement of said spider against said biasing means operates to move the rollers of said third row into equal peripheral spacing.

References Cited

UNITED STATES PATENTS 1,870,421  8/1932  Prout _____ 74—209

FOREIGN PATENTS 603,837  1/1926  France.
117,878  8/1918  Great Britain.

DONLEY J. STOCKING, *Primary Examiner.*

T. C. PERRY, *Assistant Examiner.*